May 3, 1955  R. E. SWANK  2,707,345
AUTOMATIC DISPLAY APPARATUS
Filed July 20, 1954  2 Sheets-Sheet 1

INVENTOR.
RICHARD E. SWANK
BY
Attorney

May 3, 1955    R. E. SWANK    2,707,345
AUTOMATIC DISPLAY APPARATUS
Filed July 20, 1954    2 Sheets-Sheet 2

INVENTOR.
RICHARD E. SWANK
BY
*Attorney*

United States Patent Office 2,707,345
Patented May 3, 1955

2,707,345

AUTOMATIC DISPLAY APPARATUS

Richard E. Swank, Battle Creek, Mich.

Application July 20, 1954, Serial No. 444,597

9 Claims. (Cl. 40—65)

This invention relates in general to a controllable delay, release mechanism, and more particularly to an apparatus for automatically and sequentially releasing from an elevated position a plurality of substantially upright, parallel panels.

Displays of the moving picture type have been found highly successful both in advertising and education. The reasons for this success are numerous and well settled. However, present types of moving picture displays are costly to manufacture and/or operate. Thus, their use has been very restricted.

It is also well settled that individual participation stimulates interest. Present moving picture displays are, in general, self contained units which, having been energized or started, continue to operate without need or opportunity for further extrinsic control by persons observing the display.

Such present displays usually require electric or other expensive power supply which also limits the mobility and utility of the display.

Accordingly, a primary object of my invention is the provision of a moving picture type display apparatus which sequentially exposes a plurality of panels.

A further object of this invention is the provision of an apparatus, as aforesaid, which is inexpensive to manufacture, simple in operation and requires no source of power supply, thus giving said display a mobility and utility not presently found in moving picture displays.

A further object of this invention is the provision of an apparatus, as aforesaid, in which the panels to be viewed, as well as the rate of their exposure, can be easily and quickly changed by unskilled persons.

A further object of this invention is the provision of an apparatus, as aforesaid, which has a simple, manually actuable means for initiating its operation, thereby giving the apparatus the feature of individual, extrinsic control which permits participation by the person observing the apparatus.

Other objects and purposes of this invention will become apparent to persons acquainted with this type of equipment upon reading the following specification and examining the accompanying drawings in which.

In meeting the objects set forth above, as well as others incidental thereto, I have provided a rectangular frame or container having a pair of vertically disposed, spaced guides in which a plurality of panels to be displayed are vertically slidable. Between said guides is an elevator vertically actuable by a cord and series of pulleys. A bellows is mounted on one external side of said frame near the upper end thereof and a window is provided on the opposite side of said frame. An arm, which is movable into and out of the vertical path of said panels in said guides, is mounted upon said bellows for effecting such movement. Said bellows are provided with a slow leak valve and means is attached to said elevator for collapsing the said bellows when the panels are raised to an elevated position by said elevator, thereby permitting said arm to move under said panels and support them in said elevated position. As the air is permitted to seep through the valve back into the collapsed bellows, they expand thereby retracting the said arm from beneath said panels thereby letting said panels drop one at a time back to the bottom of the said frame.

Figure 1:
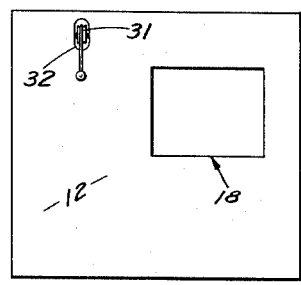
Figure 1 is a front elevation of my display apparatus.
Figure 2:
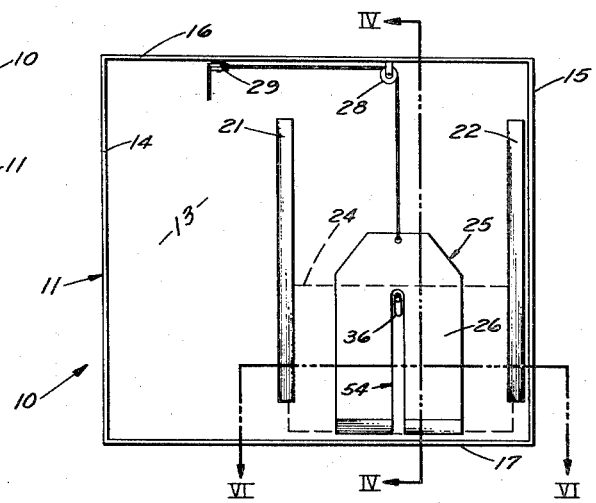
Figure 2 is a front elevation of said apparatus with the front wall thereof removed.

For convenience in description, the terms "upper," "lower," "left," "right," "front" and "rear" and derivatives thereof will have reference to the structure as appearing in Figures 1 and 2. The terms "inner" and "outer" will have reference to the geometric center of the structure and parts thereof.

Figure 6:
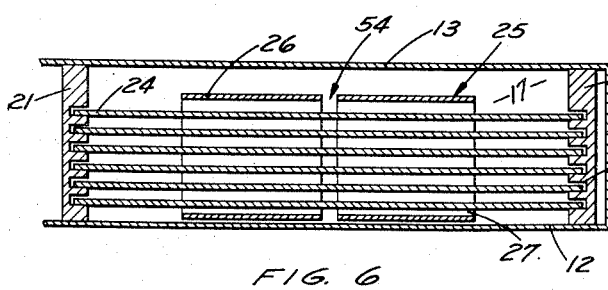
Figure 6 is a sectional view taken along the line VI—VI of Figure 2.

As shown in Figures 1, 2, 3, and 4, the display apparatus 10 has a rectangular casing or frame 11 comprised of a front wall 12, a rear wall 13, end walls 14 and 15, a top 16, and bottom 17, all of which may be made of wood, cardboard, plastic or similar material. The front wall 12 is provided with a window opening 18 near the upper end thereof in this particular embodiment. A pair of vertical guides 21 and 22 (Figures 2, 4, and 6) which may be made of wood or plastic, are provided within the frame 11 on opposite sides of the window 18 and adjacent thereto. Grooves 23 are vertically disposed in the opposed faces of said guides 21 and 22 to engage and guide the panels 24 in their upward and downward movement. The grooves in guide 21 are parallel with and opposite to the grooves in the guide 22. An elevator 25 having a back plate 26 and support plate 27 is disposed between the guides 21 and 22. The support plate 27 is horizontally disposed and substantially perpendicular to said back plate.

Figure 4:
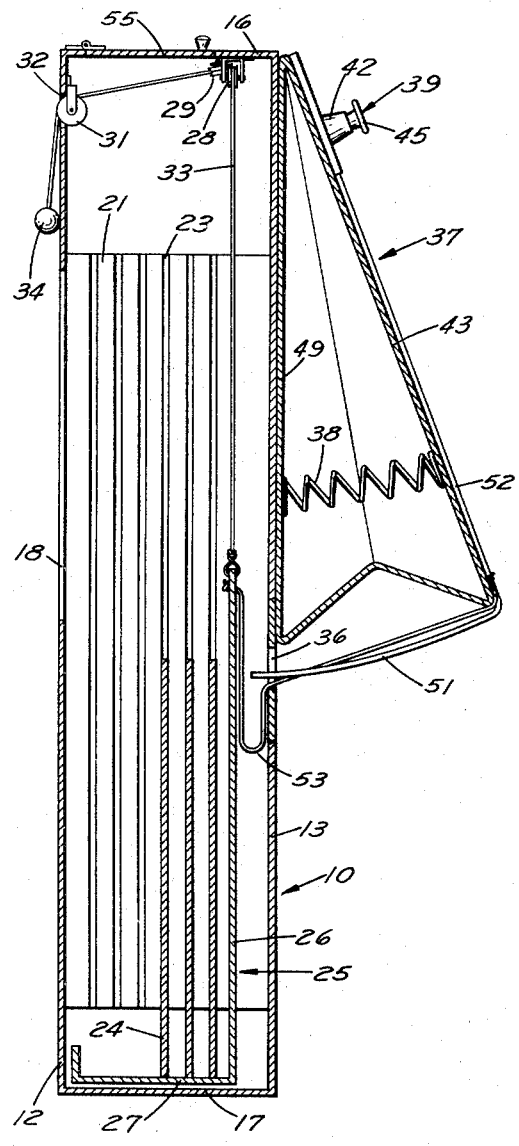
Figure 4 is a broken, sectional view taken along the line IV—IV of Figure 2.

A pulley 28 or other suitable guide means is suspended from the top 16 adjacent to the rear wall 13, and approximately midway between the guides 21 and 22, for rotation about a horizontal axis perpendicular to said rear wall 13. Another pulley or guide means 29 is mounted on said rear wall 13 within the frame 11 and adjacent to the top 16 between the guide 21 and end wall 14. Said pulley 29 is disposed for rotation about a substantially vertical axis. Another pulley 31 is mounted upon the front wall 12 near the top 16 and directly opposite the pulley 29 for rotation about a substantially horizontal axis parallel with said front wall 12. A pulley opening 32 is provided in said front wall 12 and said pulley 31 extends partially therethrough. As shown in Figures 2 and 4, a flexible cord or cable 33 is secured to the upper edge of the elevator back plate 26 and threaded over the pulleys 28, 29, and 31, in that order, the free end of said cable extending down the front wall 12. A handle 34 is secured to said free end of the cable 33. Thus, as shown in Figures 4 and 5, the elevator 25 is raised into its upper position by pulling downwardly on the handle 34.

Figure 7:
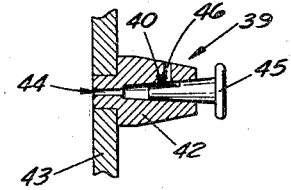
Figure 7 is a sectional view taken along the line VII—VII of Figure 3.
Figure 5:
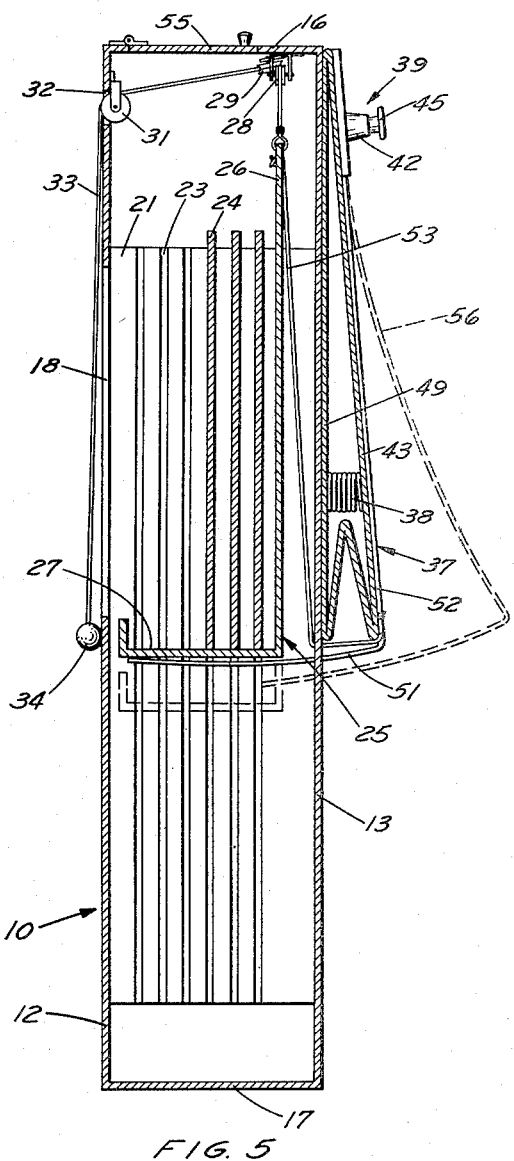
Figure 5 is a sectional view substantially as taken along the line IV—IV of Figure 2, but with the apparatus disclosed in a different operating position from that shown in Figure 4.

An arm opening 36 (Figures 3 and 4) is provided in the rear wall 13 preferably just below the lower edge of the elevator 25 when said elevator is in said raised position, as shown in Figure 5, and approximately midway between the guides 21 and 22. An air bellows 37 is mounted on the rear wall 13 directly above the arm opening 36. In this particular embodiment, the bellows 37 may be substantially conventional in structure with an internally disposed, coil spring 38 at the lower end thereof urging said bellows into the open or expanded position, as shown in Figure 4. Said bellows is provided with a slow leak valve 39 (Figure 7) and a rapid exhaust valve 41. The slow leak valve 39 has a valve body 42 secured to the rear or outer panel 43 of the bellows 37. Said valve body 42 has a coaxial opening 44 which is of reduced diameter in its inner end and is tapered outwardly at its outer end. A tapered, control plug 45, having a flat surface 40 near its inner end, is received into the opening 44. An outlet opening 46 communicates between the tapered portion of said opening 44 and the external surface of the valve body 42. Thus, the flat surface 40 of the control plug 45 controls the amount of air which seeps into the bellows through the outlet opening 46 and the coaxial opening 44 to fill the vacuum created in the bellows by the action of the coil spring 38. The bellows may be fabricated from any convenient material such as cardboard, plastic or treated cloth.

Figure 3:
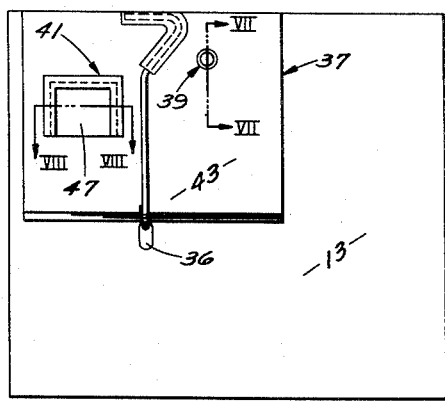
Figure 3 is a rear elevation view of my apparatus.

The exhaust valve 41 may be provided by means of placing a substantially non-porous flap 47 over a plurality of exhaust holes 48 in the outer wall 43 of the bellows 37 and securing said flap 47 along the upper and vertical edges thereof. The coil spring 38 extends between the outer wall 43 and the inner wall 49 of the bellows 37, said inner wall 49 being mounted upon the rear wall 13 of the frame 11. A support arm 51 is mounted upon the lower end of a resilient element 52 which, in this particular embodiment, extends vertically along the outer wall 43 of the bellows 37, as shown in Figures 4, 5, and 3. The resilient element 52, which is secured to the upper end of the bellows 37, urges the support arm 51 toward the front wall 12 of the frame 11 when the bellows 37 is collapsed (Figure 5) against the outward urging of the coil spring 38. The element 52 is flexible so that the bellows can be collapsed while the element is held in the broken line position 56 (Figure 5) by the panels 24 until they are completely raised. The support arm 51 is substantially perpendicular to the resilient element 52 and its forward end extends into the arm opening 36 in the rear wall 13. If the elevator 25 is fully raised before the bellows 37 is collapsed, then the resilient element can be eliminated and the support arm 52 may be anchored at its outer end upon the outer wall 43 of the bellows 37 near the lower edge thereof. In either case, the inner and outer movement of the support arm 51 through the arm opening 36 is dependent upon a prior or simultaneous movement of the outer wall 43 of the bellows 37 in the same direction.

A bellows cord or cable 53 is secured at one end to the lower edge of the bellows outer wall 43 and at its other end to the elevator cord 33 or the upper edge of the elevator back plate 26. The bellows cord 53 has a considerable amount of slack in it when the elevator is in its lower position, as shown in Figure 4. This slack is permitted to hang loose between the elevator back plate 26 and the frame rear wall 13. The bellows cord 53 is of such length that it will effect the complete collapse of the bellows, as shown in Figure 5, when the elevator is in its raised position. During the collapsing of the bellows, which is opposed by the coil spring 38, the air within the bellows is exhausted through the exhaust valve 41. As shown particularly in Figure 2, the back plate 26 of the elevator 25 is provided with a vertical slot 54 which cuts through the elevator support plate 27, also. This slot, which virtually divides the elevator into two portions on either side thereof, permits lowering of the elevator around the support arm 51 after said elevator has raised the panels 24 into their elevated position and the support arm 51 has been moved there under to hold them in said elevated position, as appearing in Figure 5.

The top 16 of the frame 11 may be provided with a hinged door 55, as shown in Figure 4, for the purpose of placing panels 24 between the grooved guides 21 and 22, or for the purpose of inspecting the interior of the apparatus.

Figure 9:
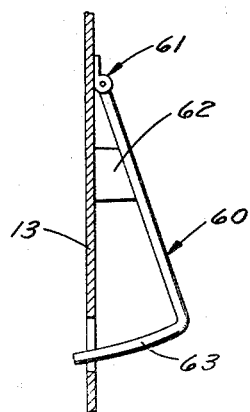
Figure 9 is a vertical, sectional view of an alternate structure.
Figure 8:
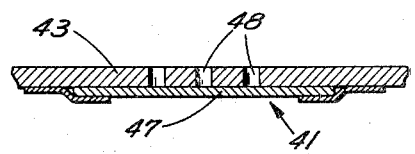
Figure 8 is a sectional view taken along the line VIII—VIII of Figure 3.

It will be recognized that, although a particular preferred structure is hereinabove disclosed with respect to the bellows and its various valves, other structures will be found equally suitable although varying somewhat in appearance. Such an alternate structure is shown in Figure 9 and described hereinafter.

*Operation*

In the operation of the apparatus 10, the panels 24 are first inserted into the groove 23 of the vertical guides 21 and 22 through the opening provided by the door 55 in the top 16 of the frame 11. The elevator 25 will be in normal, lowered position, as shown in Figure 4, due to the force of gravity acting thereon. The bellows 37 will be in the expanded position, as shown in Figure 4, due to the urging of the coil spring 38. The panels 24 will come to rest at the bottom of the frame 11 upon the elevator support plate 27. The control plug 45 is adjusted on the slow leak valve 39 as desired or required, thus providing for a certain amount of air to leak through said slow leak valve into the bellows 37. The display apparatus 10 is now ready for operation.

By pulling the handle 34 downwardly from its Figure 4 position into its Figure 5 position, the elevator 25 with the panels 24 thereon is moved from its lower, Figure 4 position to its raised, Figure 5 position. During the first part of such movement, the slack portion of the bellows cord 53, disposed as shown in Figure 4, is taken up by such upward movement. However, during the latter part of the upward movement of said elevator, the bellows 37 will be collapsed from its Figure 4 position to its Figure 5 position by the bellows cord 53. During most of this collapse of the bellows, the support arm 51 and resilient element 52 will remain in the broken line position 56, as shown in Figure 5, the inner end of said support arm 51 bearing against the rear panel in the group of panels 24 being raised by the elevator 25. When the elevator reaches the solid line position, shown in Figure 5, the support arm 51 will slip beneath the rear panel 24 carried by said elevator and move into the position shown in Figure 5 across the vertical path of said panels. When the handle 24 is released, the elevator will drop back into its Figure 4 position and the panels 24 will be supported in their raised position by the support arm 51. The bellows 37, being in its collapsed position, will immediately begin to expand by the action of the coil spring 38. The rate of such expansion will be limited by the amount of air which the slow leak valve 39 permits to go back into the confined zone within the bellows 37. As the bellows expands, it moves the resilient element 52 outwardly thereby urging the support arm 51 from its Figure 5 position toward its Figure 4 position. This permits the panels 24 to drop down one at a time in sequence from their raised position into their lowered position. As soon as the last panel has dropped, the apparatus is ready for reactuation by pulling downwardly on the handle 34. However, it will be recognized that the handle 34 may be actuated downwardly after only a portion of the panels 24 have been permitted to drop, whereby reenergizing the system and reinitiating the entire sequence.

Where the support arm 51 is secured directly to the lower edge of the bellows outer wall 43, thereby eliminating the resilient element 52, it will be necessary that the elevator 25 reaches a position above the arm opening 36 before the bellows cord 53 starts to collapse the bellows. Likewise, where the alternate structure shown in Figure 9 is used, the panels must be fully raised before the lever 60 is urged toward the rear wall 13.

It is essential that the distance between the upper edge of the elevator back plate 26 in its lowered position (Figure 4) and the pulley 28 be slightly greater than the height of said panels 24 so that said elevator may raise the panels 24 above the arm opening 36 in the rear wall 13.

It can be seen that the bellows and its associated parts, including the resilient elements 52 and support arm 51, provide a means for slowly and constantly moving the support arm 51 from its Figure 5 position into its Figure 4 position, thereby releasing the panels 24, one at a time, from their raised position into their lowered position. Therefore, it will be recognized that other types of devices and materials may be provided for carrying out this function. For example, Figure 9 discloses a substantially rigid lever 60 pivoted at 61 upon the rear wall 13 of a frame structure similar to that disclosed in Figure 4. A lump of resilient material 62, such as a silicone base plastic which is compressible but slowly returns to its original shape after compression, is placed between said rod 60 and the rear wall 13. Then the arm 63 secured to the lower end of the rod 60 operates in the same manner as the arm 51 and serves the same purpose of supporting the panels 24 in the raised position and then releasing them one at a time.

Although particular, preferred embodiments of my invention have been herein disclosed for illustrative purposes, it will be understood that variations and modifications thereof, within the scope of such disclosure and the appended claims, are fully contemplated unless specifically stated in said claims to the contrary.

I claim:

1. An apparatus for automatically releasing a plurality of substantially upright, parallel panels from an elevated position, the combination comprising: a frame having structure defining a substantially vertical path for said panels into and out of an elevated position; an arm extendable across said path for supporting said panels in said elevated position; resilient means secured to said frame for moving said arm out of said path at a substantially constant rate, said resilient means being distorted when said arm is across said path; means for raising said panels, and means for distorting said resilient means and thereby extending said arm across said path.

2. The structure of claim 1 wherein said resilient means is distorted during a portion of the raising of said panels and said arm is extended across said path as said panels reach said elevated position.

3. An apparatus for automatically and sequentially releasing a plurality of substantially upright, parallel panels from an elevated position, the combination comprising: a frame having structure defining a substantially vertical path for said panels into and out of an elevated position; an arm extendable across said path for supporting said panels in said elevated position; resilient means secured to said frame for moving said arm out of said path; means limiting the rate of such movement; movable means for raising said panels, and means responsive to the movement of said raising means for distorting said resilient means and extending said arm across said path.

4. The structure of claim 1 wherein said raising means is operatively connected to said means for distorting said resilient means and effects the distortion of said resilient means while raising said panels, and said arm is extended across said path immediately and automatically as said panels reach said elevated position.

5. An apparatus for automatically and sequentially releasing a plurality of substantially upright, parallel panels from an elevated position, the combination comprising: a substantially vertical wall having an opening therethrough; an elevator on one side of said wall for raising said panels above said opening; an arm extendable through said opening for supporting said panels in said elevated position; resilient means secured to said wall for moving said arm out of said extended position at a substantially constant rate, said resilient means being distorted when said arm is extended; manually actuable means for raising said elevator, and means responsive to raising movement of said manually actuable means for distorting said resilient means and extending said arm.

6. An apparatus for automatically and sequentially releasing a plurality of substantially upright, parallel panels from an elevated position, the combination comprising: a substantially vertical wall having an opening therethrough; an elevator on one side of said wall for raising said panels above said opening; an arm extendable through said opening for supporting said panels in said elevated position; resilient means secured to said wall for moving said arm out of said extended position; means limiting the rate of such movement; manually actuable means for raising said elevator, and means for distorting said resilient means in sequence with the raising of said elevator for moving said arm into said extended position after said panels are in their elevated position.

7. The structure of claim 6 wherein said elevator has a vertical slot extending from near the top thereof through the bottom, said slot permitting the lowering of said elevator after said arm has been extended into panel supporting position.

8. The structure of claim 6 wherein said resilient means is a collapsible, air-tight bellows having means urging it into an expanded position, and wherein the means limiting the movement of said arm is an adjustable, slow leak valve mounted on said bellows.

9. The structure of claim 6 wherein said resilient means is a collapsible, air-tight bellows having means urging it into an expanded position; wherein said arm is secured to the lower end of a resilient member secured at its upper end to said bellows near its upper end, said arm being resistibly movable with respect to said bellows and wherein the means limiting the movement of said arm is an adjustable, slow leak valve mounted on said bellows.

References Cited in the file of this patent

UNITED STATES PATENTS

| 1,510,502 | Roth | Oct. 7, 1924 |
| 2,129,647 | Carnes | Sept. 13, 1938 |

FOREIGN PATENTS

| 985,571 | France | July 20, 1951 |